(12) United States Patent
Kafri et al.

(10) Patent No.: US 10,382,483 B1
(45) Date of Patent: Aug. 13, 2019

(54) USER-CUSTOMIZED DECEPTIONS AND THEIR DEPLOYMENT IN NETWORKS

(71) Applicant: ILLUSIVE NETWORKS LTD., Tel Aviv (IL)

(72) Inventors: Alon Kafri, Even-Yehuda (IL); Tom Kahana, Gan Yavne (IL); Shani Margulis, Jerusalem (IL); Tom Sela, Holon (IL); Dolev Ben-Shushan, Netanya (IL); Tomer Shamul, Jerusalem (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 16/053,773

(22) Filed: Aug. 2, 2018

(51) Int. Cl.
*H04L 29/00* (2006.01)
*H04L 29/06* (2006.01)
*G06F 8/61* (2018.01)
*G06F 9/54* (2006.01)

(52) U.S. Cl.
CPC ............ *H04L 63/1491* (2013.01); *G06F 8/61* (2013.01); *G06F 9/54* (2013.01); *H04L 63/20* (2013.01)

(58) Field of Classification Search
CPC . G06F 9/54; G06F 21/554; G06F 8/61; H04L 63/1425; H04L 63/1491; H04L 63/20
See application file for complete search history.

(56) References Cited

U.S. PATENT DOCUMENTS

| 6,363,489 B1 | 3/2002 | Comay et al. |
| 6,618,709 B1 | 9/2003 | Sneeringer |
| 7,065,657 B1 | 6/2006 | Moran |

(Continued)

FOREIGN PATENT DOCUMENTS

| WO | 2006131124 A1 | 12/2006 |
| WO | 2015001969 A1 | 1/2015 |
| WO | 2015047555 A1 | 4/2015 |

OTHER PUBLICATIONS

Wikipedia, Active Directory, https://en.wikipedia.org/wiki/Active_Directory, Jun. 24, 2015.

(Continued)

*Primary Examiner* — Don G Zhao
(74) *Attorney, Agent, or Firm* — Soqel Group I.P Ltd.

(57) ABSTRACT

A system for generating and deploying custom deceptions for a network, including an administrator computer for generating custom deception entities (CDEs), each CDE including parameters including inter alia (i) a type of entity, (ii) conditions for deployment of the CDE, and (iii) a deception type, and a management server, comprising an application programming interface for use by the administrator computer to generate CDEs through the medium of a formal language for specifying deceptions, and a translator for translating formal language CDEs to deceptions that are installable in network endpoint computers, wherein the management computer receives a request from a network endpoint computer to retrieve CDEs, selects CDEs that are relevant to the requesting network endpoint computer based on the parameters of the CDE, translates the requested CDEs to installable deceptions, and transmits the installable deceptions to the network endpoint computer for installation thereon.

8 Claims, 4 Drawing Sheets

(56) References Cited

U.S. PATENT DOCUMENTS

| | | |
|---|---|---|
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |
| 8,181,249 B2 | 5/2012 | Chow et al. |
| 8,181,250 B2* | 5/2012 | Rafalovich .......... H04L 63/1491 |
| | | 713/187 |
| 8,250,654 B1 | 8/2012 | Kennedy et al. |
| 8,375,447 B2 | 2/2013 | Amoroso et al. |
| 8,499,348 B1 | 7/2013 | Rubin |
| 8,528,091 B2 | 9/2013 | Bowen et al. |
| 8,549,642 B2 | 10/2013 | Lee |
| 8,549,643 B1 | 10/2013 | Shou |
| 8,719,938 B2 | 5/2014 | Chasko et al. |
| 8,739,281 B2 | 5/2014 | Wang et al. |
| 8,739,284 B1 | 5/2014 | Gardner |
| 8,769,684 B2 | 7/2014 | Stolfo et al. |
| 8,819,825 B2 | 8/2014 | Keromytis et al. |
| 8,856,928 B1 | 10/2014 | Rivner et al. |
| 8,881,288 B1 | 11/2014 | Levy et al. |
| 8,925,080 B2 | 12/2014 | Hebert |
| 9,009,829 B2 | 4/2015 | Stolfo et al. |
| 9,043,905 B1 | 5/2015 | Allen et al. |
| 9,124,622 B1 | 9/2015 | Falkowitz et al. |
| 9,152,808 B1 | 10/2015 | Ramalingam et al. |
| 9,240,976 B1 | 1/2016 | Murchison |
| 9,325,728 B1 | 4/2016 | Kennedy et al. |
| 9,356,942 B1 | 5/2016 | Joffe |
| 9,386,030 B2 | 7/2016 | Vashist et al. |
| 9,495,188 B1* | 11/2016 | Ettema ................ G06F 9/45533 |
| 2002/0066034 A1 | 5/2002 | Schlossberg et al. |
| 2002/0194489 A1 | 12/2002 | Almogy et al. |
| 2003/0084349 A1 | 5/2003 | Friedrichs et al. |
| 2003/0110396 A1 | 6/2003 | Lewis et al. |
| 2003/0145224 A1 | 7/2003 | Bailey |
| 2004/0088581 A1 | 5/2004 | Brawn et al. |
| 2004/0128543 A1 | 7/2004 | Blake et al. |
| 2004/0148521 A1 | 7/2004 | Cohen et al. |
| 2004/0160903 A1 | 8/2004 | Gai et al. |
| 2004/0172557 A1 | 9/2004 | Nakae et al. |
| 2004/0255155 A1 | 12/2004 | Stading |
| 2005/0114711 A1 | 5/2005 | Hesselink et al. |
| 2005/0132206 A1 | 6/2005 | Palliyil et al. |
| 2005/0149480 A1 | 7/2005 | Deshpande |
| 2005/0235360 A1 | 10/2005 | Pearson |
| 2006/0010493 A1 | 1/2006 | Piesco et al. |
| 2006/0041761 A1 | 2/2006 | Neumann et al. |
| 2006/0069697 A1 | 3/2006 | Shraim et al. |
| 2006/0101516 A1 | 5/2006 | Sudaharan et al. |
| 2006/0161982 A1 | 7/2006 | Chari et al. |
| 2006/0224677 A1 | 10/2006 | Ishikawa et al. |
| 2006/0242701 A1 | 10/2006 | Black et al. |
| 2007/0028301 A1 | 2/2007 | Shull et al. |
| 2007/0039038 A1 | 2/2007 | Goodman et al. |
| 2007/0157315 A1 | 7/2007 | Moran |
| 2007/0192853 A1 | 8/2007 | Shraim et al. |
| 2007/0226796 A1 | 9/2007 | Gilbert et al. |
| 2007/0299777 A1 | 12/2007 | Shraim et al. |
| 2008/0016570 A1 | 1/2008 | Capalik |
| 2008/0086773 A1 | 4/2008 | Tuvell et al. |
| 2008/0155693 A1 | 6/2008 | Mikan et al. |
| 2009/0019547 A1 | 1/2009 | Palliyil et al. |
| 2009/0144827 A1 | 6/2009 | Peinado et al. |
| 2009/0222920 A1 | 9/2009 | Chow et al. |
| 2009/0241173 A1 | 9/2009 | Troyansky |
| 2009/0241191 A1 | 9/2009 | Keromytis et al. |
| 2009/0241196 A1 | 9/2009 | Troyansky et al. |
| 2009/0328216 A1* | 12/2009 | Rafalovich .......... H04L 43/0876 |
| | | 726/23 |
| 2010/0058456 A1 | 3/2010 | Jajodia et al. |
| 2010/0071051 A1 | 3/2010 | Choyi et al. |
| 2010/0077483 A1* | 3/2010 | Stolfo ................... G06F 21/554 |
| | | 726/24 |
| 2010/0082513 A1 | 4/2010 | Liu |
| 2010/0251369 A1 | 9/2010 | Grant |
| 2010/0269175 A1 | 10/2010 | Stolfo et al. |
| 2011/0016527 A1 | 1/2011 | Yanovsky et al. |
| 2011/0154494 A1 | 6/2011 | Sundaram et al. |
| 2011/0167494 A1* | 7/2011 | Bowen .................. G06F 21/566 |
| | | 726/24 |
| 2011/0214182 A1 | 9/2011 | Adams et al. |
| 2011/0258705 A1 | 10/2011 | Vestergaard et al. |
| 2011/0302653 A1 | 12/2011 | Frantz et al. |
| 2011/0307705 A1 | 12/2011 | Fielder |
| 2012/0005756 A1 | 1/2012 | Hoefelmeyer et al. |
| 2012/0084866 A1 | 4/2012 | Stolfo |
| 2012/0167208 A1 | 6/2012 | Buford et al. |
| 2012/0210388 A1 | 8/2012 | Kolishchak |
| 2012/0246724 A1 | 9/2012 | Sheymov et al. |
| 2012/0311703 A1 | 12/2012 | Yanovsky et al. |
| 2013/0061055 A1 | 3/2013 | Schibuk |
| 2013/0086691 A1 | 4/2013 | Fielder |
| 2013/0139256 A1* | 5/2013 | Tegreene ................ A61B 5/16 |
| | | 726/22 |
| 2013/0139257 A1* | 5/2013 | Tegreene ................ A61B 5/16 |
| | | 726/22 |
| 2013/0139258 A1* | 5/2013 | Tegreene ................ G06F 21/00 |
| | | 726/22 |
| 2013/0139259 A1* | 5/2013 | Tegreene ................ A61B 5/16 |
| | | 726/22 |
| 2013/0212644 A1 | 8/2013 | Hughes et al. |
| 2013/0227697 A1 | 8/2013 | Zandani |
| 2013/0263226 A1* | 10/2013 | Sudia .................. H04L 63/1466 |
| | | 726/4 |
| 2014/0082730 A1 | 3/2014 | Vashist et al. |
| 2014/0101724 A1 | 4/2014 | Wick et al. |
| 2014/0115706 A1 | 4/2014 | Silva et al. |
| 2014/0201836 A1 | 7/2014 | Amsler |
| 2014/0208401 A1 | 7/2014 | Balakrishnan et al. |
| 2014/0237599 A1 | 8/2014 | Gertner et al. |
| 2014/0259095 A1 | 9/2014 | Bryant |
| 2014/0298469 A1 | 10/2014 | Marion et al. |
| 2014/0310770 A1 | 10/2014 | Mahaffey |
| 2014/0337978 A1 | 11/2014 | Keromytis et al. |
| 2014/0359708 A1 | 12/2014 | Schwartz |
| 2015/0007326 A1 | 1/2015 | Mooring et al. |
| 2015/0013006 A1 | 1/2015 | Shulman et al. |
| 2015/0047032 A1 | 2/2015 | Hannis et al. |
| 2015/0047035 A1* | 2/2015 | Arrowood ............... G06F 21/53 |
| | | 726/23 |
| 2015/0074750 A1* | 3/2015 | Pearcy .................. G06F 21/577 |
| | | 726/1 |
| 2015/0074811 A1 | 3/2015 | Capalik |
| 2015/0096048 A1 | 4/2015 | Zhang et al. |
| 2015/0128246 A1 | 5/2015 | Feghali et al. |
| 2015/0156211 A1 | 6/2015 | Chi Tin et al. |
| 2015/0264062 A1 | 9/2015 | Hagiwara et al. |
| 2015/0326587 A1 | 11/2015 | Vissamsetty et al. |
| 2015/0326598 A1 | 11/2015 | Vasseur et al. |
| 2016/0019395 A1 | 1/2016 | Ramalingam et al. |
| 2016/0080414 A1 | 3/2016 | Kolton et al. |
| 2016/0182545 A1* | 6/2016 | Stolfo ..................... G06F 21/55 |
| | | 726/23 |
| 2016/0212167 A1 | 7/2016 | Dotan et al. |
| 2016/0261608 A1 | 9/2016 | Hu et al. |
| 2016/0300227 A1 | 10/2016 | Subhedar et al. |
| 2016/0308895 A1 | 10/2016 | Kotler et al. |
| 2016/0314111 A1* | 10/2016 | Fougner ................. G06F 17/248 |
| 2016/0323316 A1 | 11/2016 | Kolton et al. |
| 2016/0373447 A1 | 12/2016 | Akiyama et al. |
| 2017/0032130 A1 | 2/2017 | Durairaj et al. |
| 2017/0134423 A1* | 5/2017 | Sysman ................. G06F 21/554 |
| 2017/0324777 A1* | 11/2017 | Ohayon .............. H04L 63/1491 |

(56) References Cited

U.S. PATENT DOCUMENTS

2017/0344750 A1* 11/2017 Ekambaram .......... G06F 21/629
2018/0018657 A1* 1/2018 Sawant ................. G06Q 20/36

OTHER PUBLICATIONS

Wikpedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpi_networking), Jul. 3, 2014.
Mishra et al., Intrusion detection in wireless ad hoc networks, IEEE Wireless Communications, Feb. 2004, pp. 48-60.
Zhang et al., Intrusion detection techniques for mobile wireless networks, Journal Wireless Networks vol. 9(5), Sep. 2003, pp. 545-556, Kluwer Academic Publishers, the Netherlands.
U.S. Appl. No. 15/004,904, Office Action, dated May 27, 2016, 16 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Office Action, dated Aug. 19, 2016, 34 pages.
U.S. Appl. No. 15/175,050, Office Action, dated Nov. 30, 2016, 31 pages.
U.S. Appl. No. 15/175,050, Notice of Allowance, dated Mar. 21, 2017, 13 pages.
U.S. Appl. No. 15/175,052, Office Action, dated Feb. 13, 2017, 19 pages.
U.S. Appl. No. 15/175,052, Office Action, dated Jun. 6, 2017, 19 pages.
U.S. Appl. No. 15/175,054, Notice of Allowance, dated Feb. 21, 2017, 13 pages.
U.S. Appl. No. 15/403,194, Office Action, dated Feb. 28, 2017, 13 pages.
U.S. Appl. No. 15/403,194, Notice of Allowance, dated Jun. 16, 2017, 9 pages.
U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.
U.S. Appl. No. 15/175,052, Notice of Allowance, dated Jan. 2, 2018, 9 pages.
U.S. Appl. No. 15/679,180, Notice of Allowance, dated Mar. 26, 2018, 14 pages.
U.S. Appl. No. 15/722,351, Office Action, dated Mar. 9, 2018, 17 pages.
U.S. Appl. No. 15/722,351 Office Action, dated Aug. 8, 2018, 8 pages.
U.S. Appl. No. 15/682,577, Notice of Allowance, dated Jun. 14, 2018, 15 pages.
U.S. Appl. No. 15/641,817, Office Action, dated Jul. 26, 2018, 29 pages.

* cited by examiner

USER-CUSTOMIZED DECEPTIONS AND THEIR DEPLOYMENT IN NETWORKS

CROSS REFERENCES TO RELATED APPLICATIONS

The contents of the following of applicant's US patent applications are hereby incorporated herein in their entireties.

U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

FIELD OF THE INVENTION

The present invention relates to computer security, and in particular to preventing attackers from breaching computer networks.

BACKGROUND OF THE INVENTION

Reference is made to FIG. 1, which is a simplified diagram of a prior art organization network 100 connected to an external internet 10. Network 100 is shown generally with resources including endpoint computers 110, databases 120, switches and routers 130, and mobile devices 140 such as smart phones and tablets, for ease of presentation, although it will be appreciated by those skilled in the art that organization networks today are generally much more complex and include other devices such as printers, other types of network elements such as relays, and any Internet of Things objects. The various connections shown in FIG. 1 may be direct or indirect, wired or wireless communications, or a combination of wired and wireless connections. Endpoint computers 110 and databases 120 may be physical elements or logical elements, or a mix of physical and logical elements. Endpoint computers 110 and databases 120 may be virtual machines. Endpoint computer 110 and databases 120 may be local, remote or cloud-based elements, or a mix of local, remote and cloud-based elements. Endpoint computers 110 may be client workstation computers, or server computers including inter alia file transfer protocol (FTP) servers, email servers, structured query language (SQL) servers, secure shell (SSH) servers and other application servers, or a mix of client and server computers. An organization's information technology (IT) department manages and controls network 100 in order to serve the organization's requirements and meet the organization's needs.

Access to endpoint computers 110 and databases 120 in network 100 may optionally be governed by an access governor 150, such as a directory service, that authorizes users to access endpoint computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing endpoint computers 110 and databases 120 include inter alia server account credentials such as <address> <username> <password> for an FTP server, an SQL server, or an SSH server. Credentials for accessing endpoint computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of endpoint computers 110, databases 120 and their users. Access governor 150 authorizes users and computers, assigns and enforces security policies, and installs and updates software. When a user logs into an endpoint computer 110, access governor 150 checks the submitted password, and determines if the user is an administrator (admin), a normal user (user) or other user type.

Endpoint computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between organization network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as leaking data from the organization, modifying data and systems, and sabotaging data and systems.

Targeted attacks are carried out in multiple stages, typically including inter alia reconnaissance, penetration, lateral movement and payload. Lateral movement involves establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, organization structure, and implemented security solutions, and then operates in accordance with that data. One method to defend against such attacks is to plant misleading information/decoys/bait with the aim that the attacker learns of their existence and consumes those bait resources, which are monitored so as to notify an administrator of malicious activity. In order to monitor usage of deceptive information, decoy servers, referred to as "honeypots", are deployed in the organization. Background information about honeypots is available at Wikipedia.

Decoy servers try to mimic attractive real servers. However, a challenge in deploying decoy servers is to make then appear authentic. Specifically, an effective honeypot needs to appear reliable to an attacker, in particular matching attributes of real hosts such as operating system types, and local installed products.

Planting deceptions that appear reliable is a challenging issue. Conventionally, a lot of research must be carried out in order to generate reliable deceptions to plant in network resources, and the administrator, or such other user, does of have the capability to customize deceptions. I.e., the selection of deceptions is limited to those that the conventional security system provides.

SUMMARY

Embodiments of the present invention enable an administrator or other such user to generate custom deceptions. The administrator or such other user can conduct their own research and plant their own generated deceptions, irrespective of what conventional security systems offer.

Embodiments of the present invention provide a formal language for defining customize deceptions, and a formal language translation unit to generate deceptions that are installable in endpoints of the network.

There is thus provided in accordance with an embodiment of the present invention a system for generating and deploying custom deceptions for a network, including an administrator computer for generating custom deception entities (CDEs), each CDE including parameters including inter alia (i) a type of entity, (ii) conditions for deployment of the CDE, and (iii) a deception type, and a management server, comprising an application programming interface for use by the administrator computer to generate CDEs through the medium of a formal language for specifying deceptions, and a translator for translating formal language CDEs to deceptions that are installable in network endpoint computers, wherein the management computer receives a request from a network endpoint computer to retrieve CDEs, selects CDEs that are relevant to the requesting network endpoint computer based on the parameters of the CDE, translates the requested CDEs to installable deceptions, and transmits the installable deceptions to the network endpoint computer for installation thereon.

There is additionally provided in accordance with an embodiment of the present invention a method performed by a management server of a network for generating and deploying custom deceptions for the network, including generating custom deception entities (CDEs) through the medium of a formal language for specifying deceptions, each CDE including parameters including inter alia (i) a type of entity, (ii) conditions for deployment of the CDE, and (iii) a deception type, receiving a request from a network endpoint computer to retrieve CDEs, selecting CDEs that are relevant to the requesting network endpoint computer based on the parameters of the CDE, translating the selected CDEs from their formal language description to installable deceptions, and transmitting the installable deceptions to the network endpoint computer for installation thereon.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

TABLE I

Elements in the figures

| Element | Description |
|---|---|
| 10 | Internet |
| 100 | enterprise network |
| 110 | endpoint computer |
| 120 | network databases |
| 130 | network switches and routers |
| 140 | mobile devices |
| 150 | access governor (optional) |
| 160 | SIEM server |
| 170 | DNS server |
| 180 | firewall |
| 200 | enterprise network with custom deceptions |
| 210 | management server |
| 211 | API for custom deceptions |
| 212 | translator |
| 213 | deployer |
| 214 | forensic application |
| 215 | policy manager |
| 230 | policies database |
| 240 | trap servers |
| 242 | forensic alert module |

Elements numbered in the 1000's are operations of flow charts.

DETAILED DESCRIPTION

In accordance with embodiments of the present invention, systems and methods are provided for generating, deploying and managing custom deceptions. These systems and methods employ a special formal language for defining deceptions of various types.

Figure 1:
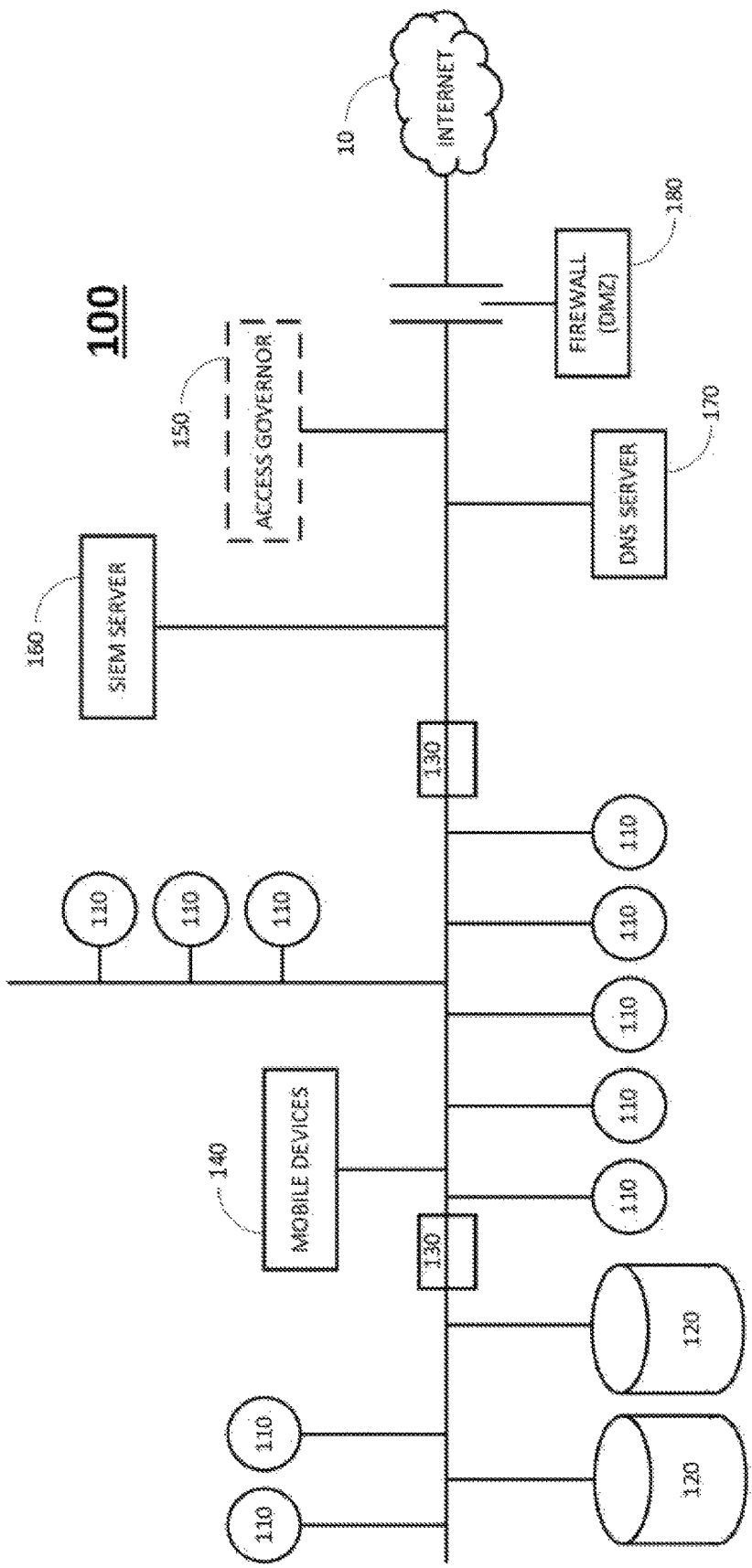
FIG. 1 is a simplified diagram of a prior art enterprise network connected to an external internet.
Figure 2:
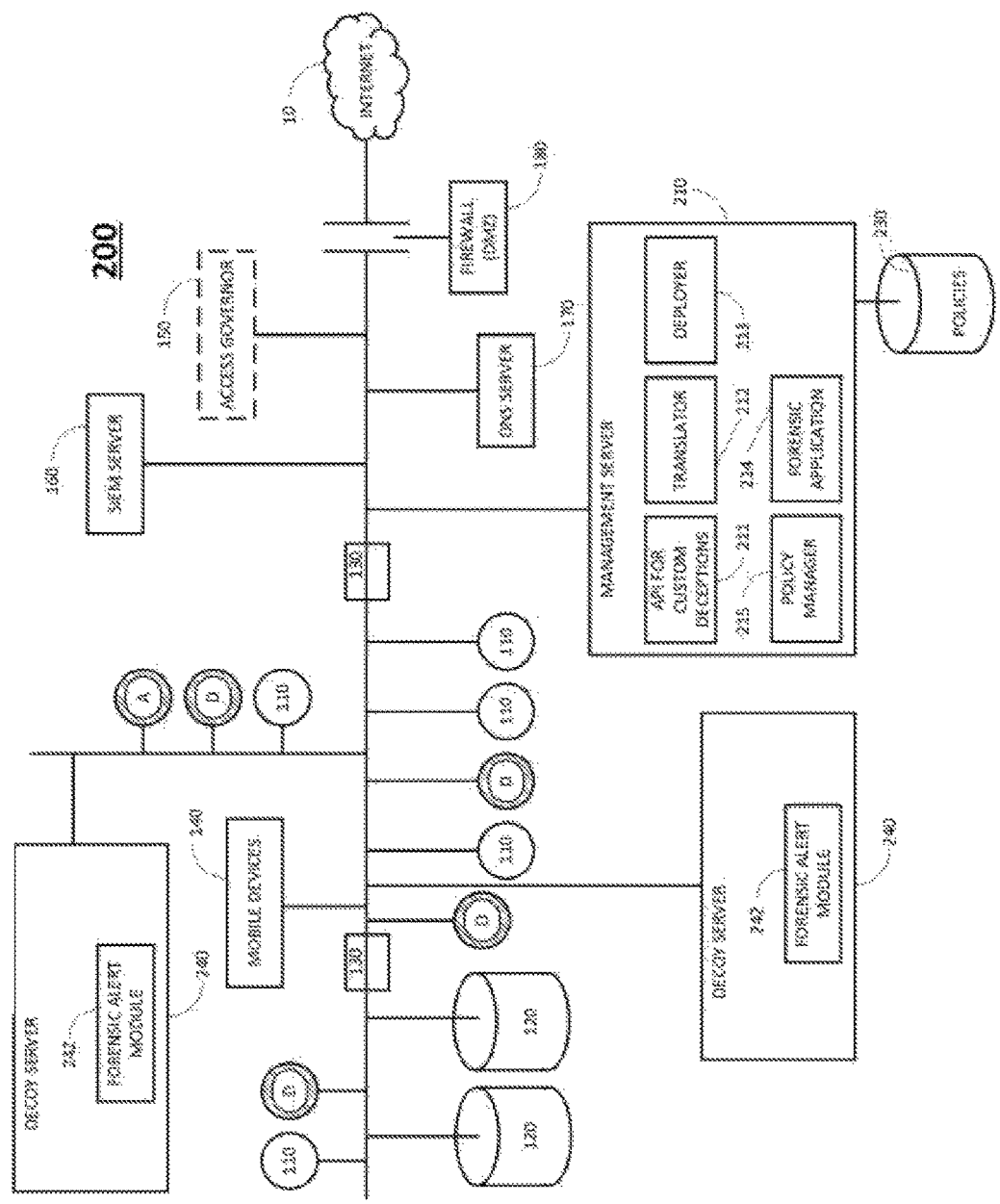
FIG. 2 is a simplified diagram of a system that generates and deploys custom deceptions, in accordance with an embodiment of the present invention.

Reference is made to FIG. 2, which is a simplified diagram of a system that generates and deploys custom deceptions, in accordance with an embodiment of the present invention. In addition to the conventional components of FIG. 1, FIG. 2 shows a network 200 that includes a management server 210 and a policy database 230. FIG. 2 also shows several endpoint computers 110 that have custom deceptions, designated D, planted therewithin. FIG. 2 also shows an endpoint computer used by an administrator of network 200, designated A.

Management server 210 includes an application programming interface (API) 211 for generating, editing and deleting custom deceptions, a translator 212 for translating from the native formal language for defining deceptions to actual deceptions that may be installed in endpoints of network 200, a deployer 213 that changes the deployment flow so as to include installation or uninstallation of custom deceptions. Generally, the administrator of network 200 generates, edits and deletes the custom deceptions using API 211.

Management server 210 also includes a forensic application 214, which is a real-time application that is transmitted to an endpoint computer 110 in the network, when a deception is accessed by that computer 110, this indicating that that computer has been breached by an attacker. When forensic application 214 is launched on the endpoint computer, it identifies a process running within that endpoint computer 110 that accessed the deception, logs the activities performed by the thus-identified process in a forensic report, and transmits the forensic report to management server 210.

Management server 210 also includes a policy manager 215. Policy manager 215 defines a decoy and response policy. The response policy defines different decoy types, different decoy combinations, response procedures, notification services, and assignments of policies to specific network nodes, network users, groups of nodes or users or both. Once policies are defined, they are stored in policy database 230 with the defined assignments.

Each decoy server 240 includes a forensic alert module 242, which alerts management system 210 that an attacker is accessing the decoy server via an endpoint computer 110 of the network, and causes management server 210 to send forensic application 214 to the endpoint computer 110 that is accessing the decoy server. In an alternative embodiment of the present invention, decoy server 240 may store forensic application 214, in which case decoy server 240 may transmit forensic application 214 directly to the endpoint computer 110 that is accessing decoy server 240. In another alternative embodiment of the present invention, management server 210 or decoy server 240 may transmit forensic application 214 to a destination computer other than the endpoint computer 110 that is accessing decoy server 240.

Based on a current policy, deployer 213 receives a request from an endpoint computer 110 for deceptions to install, and deployer 213 decides what should be installed and what should be uninstalled, based on inter alia the assignment of endpoint computer 110 and the deception settings. CDGs are assigned to policies. If a CDG is assigned to a current policy that includes endpoint computer 110, then deployer 213 sends the CDG to endpoint computer 110 for installation. Otherwise, if the current policy does not include endpoint computer 110 and the CDG was previously installed on endpoint computer 110, then deployer 213 sends an instruction to endpoint computer 110 to uninstall the CDG.

Figure 3:
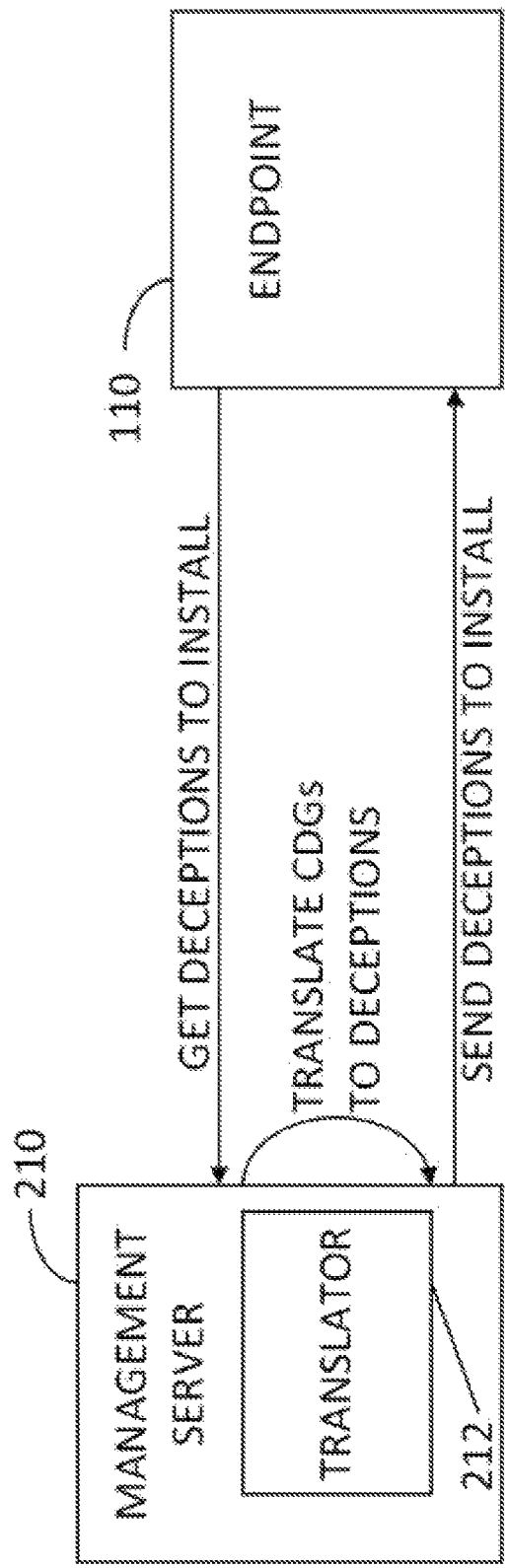
FIG. 3 is a simplified diagram showing how custom deceptions are deployed, in accordance with an embodiment of the present invention.
Figure 4:
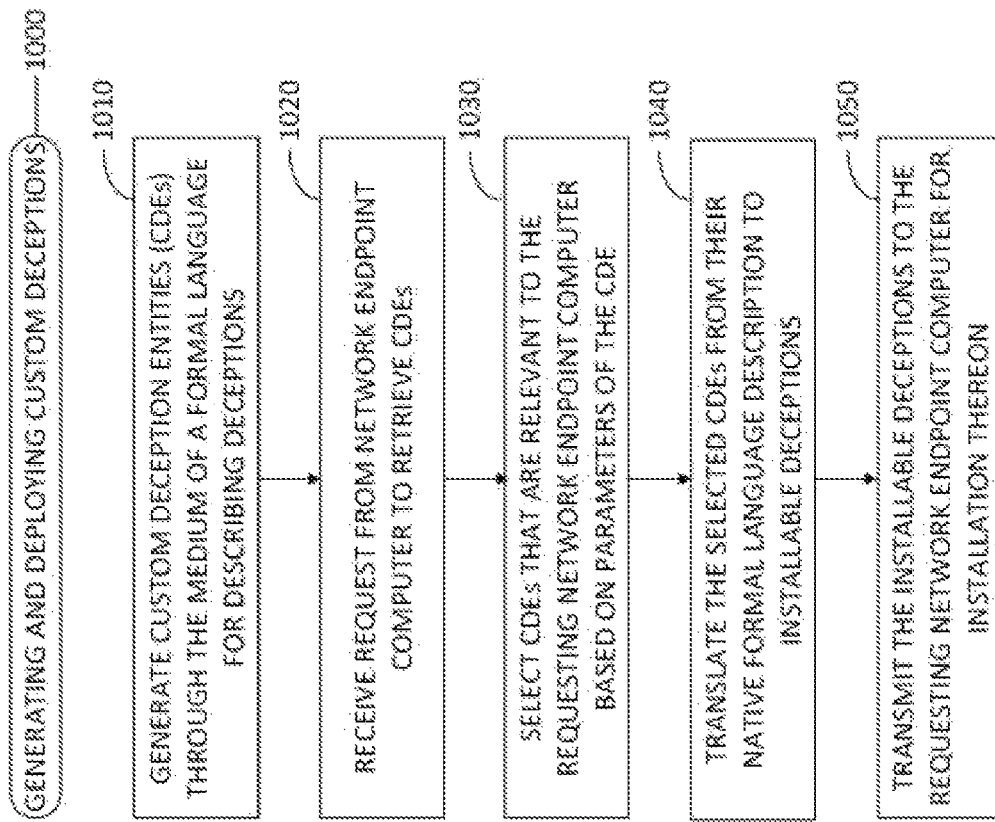
FIG. 4 is a simplified flowchart of a method for generating and deploying custom deceptions, in accordance with an embodiment of the present invention.

Reference is made to FIG. 3, which is a simplified diagram showing how custom deceptions are deployed by deployer 213, in accordance with an embodiment of the present invention. FIG. 3 shows three phases, as follows.

1. Endpoint computer 110 sends a "get deception to install" request to management server 210;
2. Management server 210 determines the relevant deceptions for the specific endpoint computer 110, based on the endpoint computer context, such as logged in users and running processes, and translates the relevant deceptions from their native formal language description to an actual deception that is installable on endpoint computer 110; and
3. Management server 210 transmits to endpoint computer 110 relevant deceptions to install/uninstall, based on a snapshot of endpoint computer 110.

In order to add a CDG to the flow, when management server 210 determines the relevant deceptions to install, management server 210 chooses from the regular deceptions and the CDGs that are configured on the system. Translator 212 then validates the conditions of the CDG, and translates the CDG from their formal language description into an actual deception to install.

When endpoint computer 110 finishes the installation process, it sends the status of each deception to management server 210. Management server 210 saves the status in a snapshot of endpoint computer 110. As such, when the administrator or such other user deletes the CDG, or unassigns endpoint computer 110 from the policy, management server 210 knows the exact file or registry to look for, in order to uninstall the CDG.

Formal Deception Language

A basic construct is a custom deception entity (CDE), which has parameters inter alia as shown in TABLE II below.

TABLE II

Custom Deception Entity (CDE)

| Parameter | Description |
| --- | --- |
| Type | File/Registry/Executable |
| Conditions | Operating system (Windows/Mac/Linux) |
|  | Running process |
|  | Files existence |
|  | Registry key existence |
|  | Binary operators on these items |
| Deception Type | SSH/FTP/RDP/User |

The type parameter specifies whether the deception is a file-based custom deception, a registry-based custom deception, or an executable deception. TABLES III-V below indicate inter alia the parameters for each of these types of deceptions.

TABLE III

File-based custom deception

| Parameter | Description |
| --- | --- |
| Location | An absolute path of a contextual path. E.g., a user home folder has a placeholder <HOME_FOLDER> |
| Filename | The filename of the file deception |
| Permissions | The permissions of the file, including contextual permissions <PERMISSION> |
| Visibility | Whether the file is hidden or unhidden |
| Content | The file content with keywords to be replaced |

TABLE IV

Registry-based custom deception

| Parameter | Description |
| --- | --- |
| Location | An absolute registry key path or a contextual path. E.g., a user home folder has a placeholder <HKEY_USERS> |
| Registry key | The registry key name of the file deception |
| Content | The registry value containing the keywords to be replaced |

TABLE V

Executable deception

| Parameter | Description |
| --- | --- |
| Executable to install | An executable that contains the keywords to be replaced for deception installation |
| Executable to uninstall | An executable that contains the keywords to be replaced for deception uninstallation |

The following keywords inter alia are used for the formal deception language. Each keyword is to be replaced with actual deceptive content.

<SERVER_NAME1>, <SERVER_NAME2>, . . .
<USER_NAME1>, <USER_NAME2>, . . .
<PASSWORD1>, <PASSWORD2>, . . .
<PORT1>, <PORT2>, . . .
<HKEY_USERS>
<HOME_FOLDER>
<PERMISSION>
<HIDDEN>

A custom deception group (CDG) is a set of CDEs. Custom deceptions API 211 exposes inter alia the following methods.

GET returns the CDGs as configured in the system
POST CREATE CDG receives a CDG as input, and generates the CDG in the system
DELETE CDG receives a CDG as input, and deletes the CDG from the system The input to translator 212 is combined with custom deception parameters and the contextual parameters vis-à-vis the specific endpoint; e.g., contextual users, running processes and installed applications. Translator 212 replaces keywords with the given input. E.g., if the deception type is SSH, management server 210 chooses an SSH trap server and replaces <SERVER_NAME> with the name of the trap server. If there are multiple <SERVER_NAME> keywords, then management server 210 finds a number of trap servers to replace the keywords.

It is noted that each CDG has its own specific conditions; e.g., processes that run on the system, and a file that exists on the file system. When translator 212 translates a CDG to deceptions, translator 212 must validate that the conditions are met in order to transmit the deceptions.

It will be appreciated by those skilled in the art that the above formal language for defining deceptions may be extended. E.g., plant deception file_deception(name, location, file_name, permission, visibility, content) with values ("deception_name", "C:\Users", "file.txt", "READ-ONLY", "hidden", "content with <SERVER_NAME> and <USER_NAME>) where "process1" is in running_processes and operating_system="Windows"

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for generating and deploying custom deceptions for a network, comprising:
 an administrator computer for generating custom deception entities (CDEs), each CDE comprising parameters including inter alia (i) a type of entity, (ii) conditions for deployment of the CDE, and (iii) a deception type; and a management server, comprising:
- an application programming interface (API) for use by said administrator computer to generate CDEs through a medium of a formal language for specifying deceptions, the formal language comprising keyword placeholders for servers, usernames and passwords; and
- a translator for translating formal language CDEs to deceptions that are installable in network endpoint computers, comprising replacing the keyword placeholders for servers, usernames and passwords with actual server names, usernames and passwords, wherein said management computer receives a request from a network endpoint computer to retrieve CDEs, selects CDEs that are relevant to the requesting network endpoint computer based on the parameters of the CDE, translates the selected CDEs to installable deceptions, and transmits the installable deceptions to the network endpoint computer for installation thereon.

2. The system of claim 1 wherein said management server further comprises:
- a policy manager for selecting a deception policy and enforcing it; and
- a deployer for planting deceptions in endpoint computers of the network in accordance with the selected deception policy.

3. The system of claim 1 wherein said management server further comprises a forensic application for transmission to a network endpoint computer on which a CDE is installed when an attacker who has breached the network endpoint computer attempts to access the CDE, in order to collect forensics of the attacker's activities.

4. The system of claim 1 wherein said management server receives a request from said administration computer to delete designated CDEs, in response to which said management server deletes the designated CDEs from its storage.

5. A method performed by a management server of a network for generating and deploying custom deceptions for the network, comprising:
- providing an application programming interface for generating custom deception entities (CDEs) through a medium of a formal language for specifying deceptions, the formal language comprising keyword placeholders for servers, usernames and passwords, each CDE comprising parameters including inter alia (i) a type of entity, (ii) conditions for deployment of the CDE, and (iii) a deception type;
- receiving a request from a network endpoint computer to retrieve CDEs;
- selecting CDEs that are relevant to the requesting network endpoint computer based on the parameters of the CDE;
- translating the selected CDEs from their formal language description to installable deceptions, comprising replacing the keyword placeholders for servers, usernames and passwords with actual server names, usernames and passwords; and
- transmitting the installable deceptions to the network endpoint computer for installation thereon.

6. The method of claim 5 further comprising:
selecting a deception policy; and
planting deceptions in endpoint computers of the network in accordance with the selected deception policy.

7. The method of claim 5 further comprising transmitting a forensic application to a network endpoint computer on which a CDE is installed when an attacker who has breached the network endpoint computer attempts to access the CDE, in order to collect forensics of the attacker's activities.

8. The method of claim 5 further comprising:
further receiving a request to delete designated CDEs; and
in response to said further receiving a request, deleting the designated CDEs from its storage.

* * * * *